United States Patent
Rakshit

(10) Patent No.: US 10,769,596 B2
(45) Date of Patent: Sep. 8, 2020

(54) RESOURCE VALIDATION BASED EVENT SCHEDULING IN A SOCIAL NETWORK

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 552 days.

(21) Appl. No.: 15/414,169

(22) Filed: Jan. 24, 2017

(65) Prior Publication Data

US 2018/0211229 A1    Jul. 26, 2018

(51) Int. Cl.
  G06Q 10/10    (2012.01)
  G06Q 50/00    (2012.01)
  G06Q 10/02    (2012.01)

(52) U.S. Cl.
  CPC ......... G06Q 10/1093 (2013.01); G06Q 10/02 (2013.01); G06Q 50/01 (2013.01)

(58) Field of Classification Search
  CPC .......... G06Q 10/1093; G06Q 10/1095; G06Q 10/06314; G06F 7/02
  USPC .............................. 705/5, 7.13, 9; 340/539.1
  See application file for complete search history.

(56) References Cited

U.S. PATENT DOCUMENTS

| | | | | |
|---|---|---|---|---|
| 2009/0248456 A1* | 10/2009 | Fahmy | ................... | G06Q 10/02 705/5 |
| 2014/0108066 A1* | 4/2014 | Lam | ....................... | G06Q 10/10 705/5 |
| 2014/0244017 A1 | 8/2014 | Freiwirth et al. | | |
| 2015/0006208 A1* | 1/2015 | Nestor | ................... | G06Q 10/02 705/5 |
| 2015/0039357 A1* | 2/2015 | Segal | ............... | G06Q 10/06314 705/5 |

(Continued)

OTHER PUBLICATIONS

Kabilan, P., et al., "Facebook Based Home Appliances Security Control And Monitoring Using Microcontroller", [retrieved on Sep. 20, 2016]. Retrieved from the Internet: < URL: http://apjor.com/downloads/010420154.pdf>, Asia Pacific Journal of Research vol. I, Issue XXV, Mar. 2015, 7 pgs.

(Continued)

*Primary Examiner* — Vanel Frenel
(74) *Attorney, Agent, or Firm* — Michael O'Keefe; Matthew M. Hulihan; Heslin Rothenberg Farley & Mesiti PC

(57) ABSTRACT

Resource-validation-based event scheduling in a social network. A method identifies, based on activity in a social network, planning of an event. The method determines event parameters of the event, for instance by determining an anticipated number of attendees of the event, and profiling predicted attendees of the event to identify attendee preferences. The method solicits resource validation information from device(s) corresponding to resource(s) at a location for the event. The resource validation information indicates ability of the device(s) to support estimated resource consumption for each of the resource(s), the estimated resource consumption based on the determined event parameters. The method receives the resource validation information, and schedules the event based on the resource validation information.

20 Claims, 8 Drawing Sheets

(56) References Cited

U.S. PATENT DOCUMENTS

| | | | | |
|---|---|---|---|---|
| 2015/0112738 | A1* | 4/2015 | Marinaro | G06Q 10/02 |
| | | | | 705/5 |
| 2017/0109709 | A1* | 4/2017 | Wu | G06F 7/02 |
| 2017/0238145 | A1* | 8/2017 | Ferrell | G06N 5/02 |
| | | | | 455/456.3 |
| 2017/0366394 | A1* | 12/2017 | Kurian | H04L 41/0803 |

OTHER PUBLICATIONS

Laikari, Arto, et al., "Networking home appliances with adapters and UPnP", [retrieved on Sep. 20, 2016]. Retrieved rom the Internet: <URL: <http://ieeexplore.ieee.org/document/4559442/?tp=&arnumber=4559442&url=http:%2F%2Fieeexplore.ieee.org%2Fxpls%2Fabs_all.jsp%3Farnumber>, 2008 IEEE International Symposium on Consumer Electronics, Apr. 14-16, 2008, 2 pgs.

Kim, Dong-Sung, et al., "Design and implementation of home network systems using UPnP middleware for networked appliances", [retrieved on Sep. 20, 2016]. Retrieved from the Internet: <URL: http://ieeexplore.ieee.org/document/1196427/?tp=&arnumber=1196427&url=http:/%2F%2Fieeexplore.ieee.org%2Fiel5%2F30%2F26922%2F01196427>, IEEE Transactions on Consumer Electronics (vol. 48, Issue: 4, Nov. 2002), 2 pgs.

Nuhijevic, V., et al., "An intelligent home networking system", [retrieved on Sep. 20, 2016]. Retrieved from the Internet: <URL: http://ieeexplore.ieee.org/document/6031824/?tp=&arnumber=6031824&url=http:%2F%2Fieeexplore.ieee.org>, 2011 IEEE International Conference on Consumer Electronics—Berlin (ICCE-Berlin), Sep. 6-8, 2011, 2 pgs.

Kim, Yong-Soo, "Real-Time Intelligent Home Network Control System", [retrieved on Sep. 20, 2016]. Retrieved from the Internet: <URL: http://link.springer.com/chapter/10.1007%2F978-3-642-23312-8_32#page-1>, 2011, 3 pgs.

TWC Community Forums, "Intelligent Home Netgear Router", [retrieved on Sep. 20, 2016]. Retrieved from the Internet:.<URL: <http://forums.timewarnercable.com/t5/Home-Networking/Intelligent-Home-Netgear-Router/td-p/12281>, Nov. 28, 2013, 3 pgs.

Mell, Peter, et al., "The NIST Definition of Cloud Computing", NIST Special Publication 800-145, Sep. 2011, Gaithersburg, MD, 7 pgs.

* cited by examiner

RESOURCE VALIDATION BASED EVENT SCHEDULING IN A SOCIAL NETWORK

BACKGROUND

Users in a social network communicate and collaborate with each other, share photographs and other media, comment on posts, and perform various other activities. One such activity is creating calendar events and planning those events, including the distribution of invitations and the coordination of event details such as the timing and location of the event. Meanwhile, an ever-increasing number of devices around our homes and other spaces that frequently serve as venues for a hosted event are becoming network-connected such that users can interact with and control these devices from a remote location. It is becoming more common to incorporate network-connectivity into conventionally unintelligent devices like dishwashers, water filters, and HVAC systems in order to add intelligence, flexibility, and adaptability to them. Interaction with these smart devices may include periodic maintenance, powering-on, starting, switching-off, and changing parameters, as examples. The potential for integrating event planning with smart device capability has not been exploited.

SUMMARY

Shortcomings of the prior art are overcome and additional advantages are provided through the provision of a computer-implemented method. The method identifies, based on activity in a social network, planning of an event. The method determines event parameters of the event, for instance by determining an anticipated number of attendees of the event, and profiling predicted attendees of the event to identify attendee preferences. The method solicits resource validation information from device(s) corresponding to resource(s) at a location for the event. The resource validation information indicates ability of the device(s) to support estimated resource consumption for each of the resource(s), the estimated resource consumption based on the determined event parameters. The method receives the resource validation information, and schedules the event based on the resource validation information.

Further, a computer program product including a computer readable storage medium readable by a processor and storing instructions for execution by the processor is provided for performing a method. The method identifies, based on activity in a social network, planning of an event. The method determines event parameters of the event, for instance by determining an anticipated number of attendees of the event, and profiling predicted attendees of the event to identify attendee preferences. The method solicits resource validation information from device(s) corresponding to resource(s) at a location for the event. The resource validation information indicates ability of the device(s) to support estimated resource consumption for each of the resource(s), the estimated resource consumption based on the determined event parameters. The method receives the resource validation information, and schedules the event based on the resource validation information.

Yet further, a computer system is provided that includes a memory and a processor in communications with the memory, wherein the computer system is configured to perform a method. The method identifies, based on activity in a social network, planning of an event. The method determines event parameters of the event, for instance by determining an anticipated number of attendees of the event, and profiling predicted attendees of the event to identify attendee preferences. The method solicits resource validation information from device(s) corresponding to resource(s) at a location for the event. The resource validation information indicates ability of the device(s) to support estimated resource consumption for each of the resource(s), the estimated resource consumption based on the determined event parameters. The method receives the resource validation information, and schedules the event based on the resource validation information.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilities for resource-validation based event scheduling. Often times the planning and execution of an event has a relationship with resources available at the event venue. Resources encompass anything that is consumed or used during an event. By way of example and not limitation, resources that are consumed or used may be: food and beverages; appliances; electricity and power; seating; air quality, heating, and cooling; digital media and entertainment; activities; games; and physical space, though many other example of resources exist.

Network connected device(s) may correspond to a resource. For instance, the resource itself may be a connected device (such as a connected appliance like a dishwasher or refrigerator) or incorporate a connected device. The device may be a dishwasher or smart thermostat that includes a computer system that connects to a user's home network, for example, in which case the dishwasher or thermostat may be considered a network-connected or smart device. Additionally or alternatively, a device may correspond to a resource in that the device can deliver information about the resource and potentially control it. A network-connected sensor device on a bottle of juice (the resource) may monitor the level of juice in the bottle and report the volume of juice left, order more juice, or perform other activities related to the resource.

In examples presented herein, the venue for the event is a coordinating user's home, though it should be understood that this is by way of example only. An event may have a relationship with resources available at the user's home. The event may be a gathering of friends at someone's house and example resources consumed during this event may include the HVAC system to cool the interior of the home, a water purifier to filter drinking water, and a dishwasher to perform a necessary task of washing dishes. Aspects described herein provide real-time communication between home networked devices and a platform, such as a social network, used to plan an event, by which a user can make appropriate planning decisions when communicating with attendees to plan the event, including details thereof such as time and date of the event.

Figure 1:
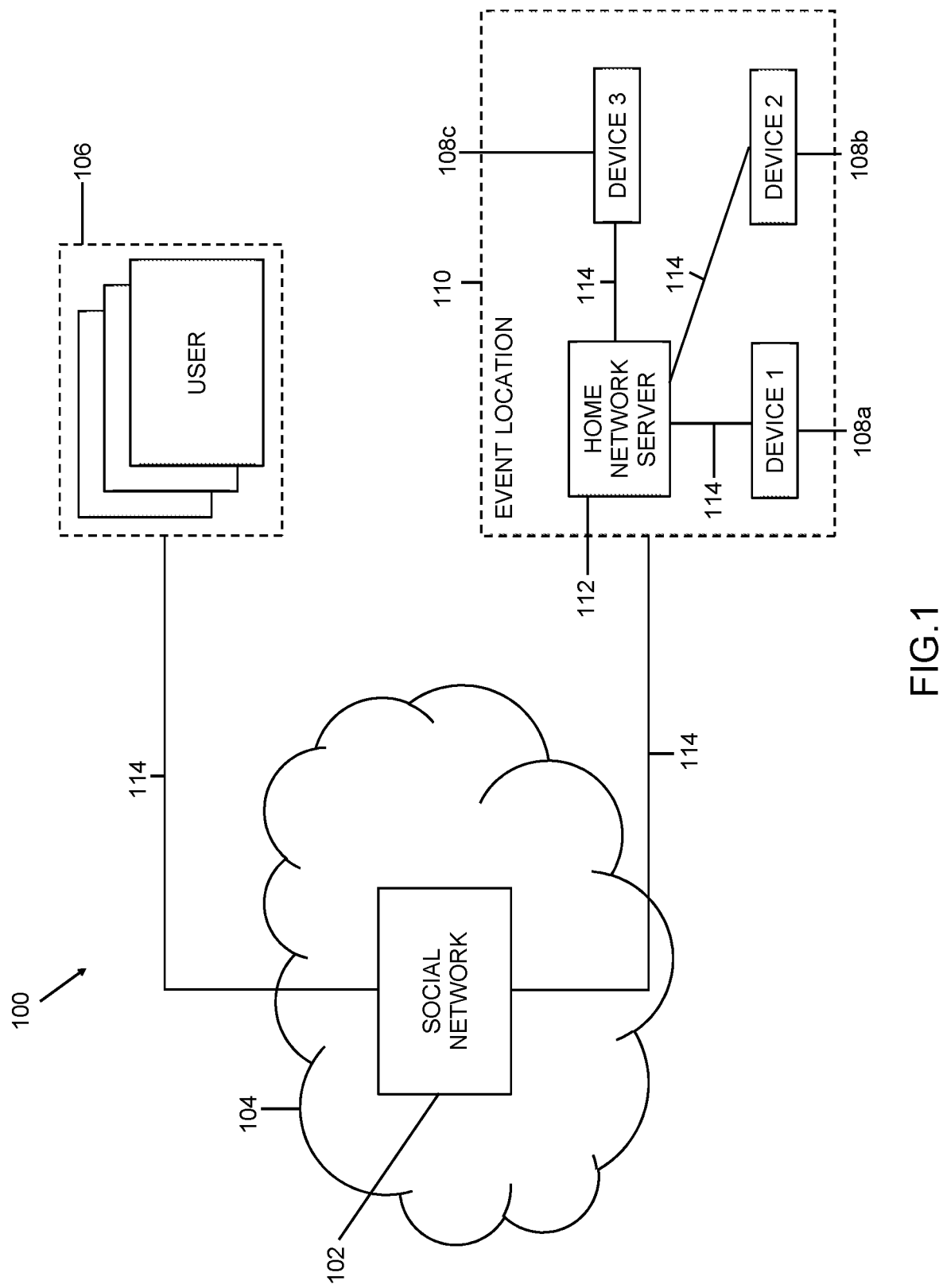
FIG. 1 depicts an example environment to incorporate and use aspects described herein.

FIG. 1 depicts an example environment 100 to incorporate and use aspects described herein. Environment 100 includes a facility (in this example social network 102) in which users plan an event. The social network 102 is hosted in a cloud environment 104, for instance on social network servers thereof represented by 102. Users 106 communicate with the social network, e.g. via computer systems represented by 106 that connect to the internet to access the social network. As an example, users 106 use computer devices of the environment to interact with each other via the social network, and post digital content such as messages, replies, likes, dislikes, and media.

Also included in the environment are a plurality of devices (108a, 108b, 108c) that correspond to resources at an event location 110, that is, a location at which an event is to take place. Devices 108a, 108b, 108c also communicate with the social network 102. In this example, the communication between the devices and the social network is made via a home network server 112 to which each device 108a, 108b, 108c connects, and which communicates with the social network 102. An example home network server is a smart hub device that connecters wired or wirelessly to the user's home router or modem for internet access to communicate with the social network 102. In other examples, one or more of devices 108a, 108b, 108c connect directly to the internet in order communicate with social network 102.

The components in FIG. 1 form wired or wireless network(s), and communication between the devices takes place via wired or wireless communications links 114 for communicating data between the devices. FIG. 1 is just one example of an environment to incorporate and use aspects described herein.

According to aspects described herein, software of social network server(s) can perform contextual analysis of the interaction between social network users. It can identify whether the interaction is related to an event being planned or to-be planned. For instance, it can assess whether the interaction between users includes invitations of one or more users to get together at a user's house. Based on this contextual analysis, software can identify/predict how many users and which particular users are expected to attend the event.

Other event parameters may be determined. Because a substantial amount of personal information about the users and user preferences are likely to be available on the social network, software may be able to identify gender, age, location, and personal preferences some or all of the attendees. Accordingly, based on the contextual analysis, software may be able to determine other event parameters, such as choices or preferences of potential attendees and their guests as they relate to food and beverages, entertainment, activities, environment, location, and any other relevant aspects of the event.

The parameters can inform estimated resource consumption. For instance, for an estimated attendance of twenty-five attendees, it may be estimated based on user preferences, trends, and/or statistical analysis that the users are statistically likely to 'consume' ten servings of juice, twenty servings of water, fifteen chairs or seating positions (on average during the event), thirty-five plates, and prefer an interior air temperature of 70 degrees. The social network can then solicit resource validation information from, e.g., a home network server (112 of FIG. 1), the devices themselves, or any other appropriate device corresponding to the devices at a location or potential location for the event. The solicitation can be for an indication about whether the device(s) can support the estimated consumption. Further to the example above, device(s) such as the refrigerator or an imaging device installed in the user's pantry might sense that there are only eight servings of juice; a water purifier may indicate that it is capable of filtering 150 more servings; a camera or other sensor may sense a user's interior seating capacity of seventeen (or this information might be pre-programmed into the home network server as a parameter of the venue); a dishwasher might indicate a scheduled maintenance for the evening of the event; and the HVAC system and thermostat of the home may confirm that air temperature of 70 degrees will be provided at the time of the event.

Accordingly, the devices can perform a validation in terms of their ability to support the estimated resource consumption (capacity, availability, storage, etc.) for one or more resources. Available information from the one or more devices can be displayed to user(s) of the social network, for instance to a user planning the event or to other users participating in the communications from which the social network detects that an event is being planned. Based on the resource validation information, the user(s) can solidify a date, time, and other events details for the event and/or an invitation to send for the event. Users may also be able to interact with the home network server or an individual device through the social network and/or via text-based communication in order to obtain additional details about the ability of the device to support the estimated resource consumption and options that the device supports for delivering the resource.

Based on the above, in some examples the social network recommends one or more invitation dates/times at which to have the event, i.e. times when the estimated resource consumption is supported by the necessary devices, or most fully satisfies the estimated resource consumption. Additionally or alternatively, especially in situations where there is no convenient time at which all devices can fully support the resource consumption, the social network may display alternate approaches or suggestions about how the consumption may be supported. For example, it may recommend that the user purchase additional beverages, and may even offer to automatically place such an order for delivery in time for the event.

An example discussion between users is provided below to help illustrate aspects described herein:

User A: "It has been a while since we saw each other. How about we meet sometime soon at my place?"

User B: "Sure, how about this coming Sunday? Let's invite User C and User D too."

User A: "Great idea. Let's also invite User E, and invite everyone's family members too"

From the above conversation, the social network can analyze the content and identify a desire for Users A and B to coordinate an event inviting Users C, D, E, and everyone's family members to meet this coming Sunday (or otherwise sometime soon, say within 7 days) at User A's house. The users may be profiled by the social network, identifying their particular preferences, likes and dislikes, recent comments, and any other information that may be relevant to desired resources to be available and consumption thereof. Based on this information, the social network can solicit resource validation information from devices corresponding to resources at User A's house. This can involve the social network providing event parameters and details like number and identification of attendees, proposed time of the event, user preferences, expectations or plans about the event, and so on. The solicitation may be a communication to the home network server at User A's house and/or a communication sent directly to the devices, as examples. The home network server can analyze the received information and determine how different devices corresponding to the resources are impacted. The devices can send appropriate messages to the social network and/or user(s). Software can also display contextual action items to a user, which the user can use to take action. If a user desires additional information about a device, then user can interact with the device to obtain the additional information. The home network server can gather information related to the ability of the relevant devices to support estimated resource consumption, and provide that information back to the social network and/or User A or the other invitees. For instance:

The dishwasher may respond: "I have scheduled maintenance to take place this Sunday; should I postpone that maintenance until next Sunday?" and provide YES/NO selections for the home network server, social network, and/or User A (or other invitee) to make a selection about whether the dishwasher would postpone the scheduled maintenance until after the event.

The refrigerator may respond: "Your friends User C and User D like to drink orange juice and you have only half of a bottle. You should purchase at least one more bottle." and provide Order Now and Order Later selections for the home network server, social network, and/or User A (or other invitee) to make a selection about whether additional orange juice should be ordered.

The social network may provide a television or home entertainment center an indication that User D had plans to watch a particular movie with his family that night (and therefore this is a potential entertainment option for all attendees), and accordingly respond: "User D and his family wanted to watch Movie that night; would you like me to Buy or Rent the Movie?" and provide Buy, Rent, and Ignore selections for the home network server, social network, and/or User A (or other invitee) to make a selection about whether to purchase or rent (physically or digitally through a streaming provider) the movie.

The microwave, anticipating use for appetizers or other food, may respond: "I am OK with this plan for Sunday night."

User(s) may be able to communicate with home network devices (perhaps through a home network server) to obtain additional details about an ability of a device to support the estimated resource consumption for a resource, and/or details about options that the device supports for delivering the resource. In some examples, the home network server or social network can perform a contextual analysis of a question and answer the question automatically if the home network server is given authority on the relevant inquiry.

An example exchange between User A and User A's home smart device (smart dishwasher) relative to the planned event on the upcoming Sunday is as follows:

Dishwasher: "I have scheduled maintenance to take place this Sunday; should I postpone that maintenance until next Sunday?"

User A: "Is it possible to schedule the party for Sunday night? Will the maintenance during the day be finished by Sunday night?"

Dishwasher: "It will not be possible, the service center needs several hours to perform the maintenance."

In the above example, User A can then make a decision about whether to postpone the maintenance until the following Sunday or perhaps reschedule the event to another evening.

Figure 2A:
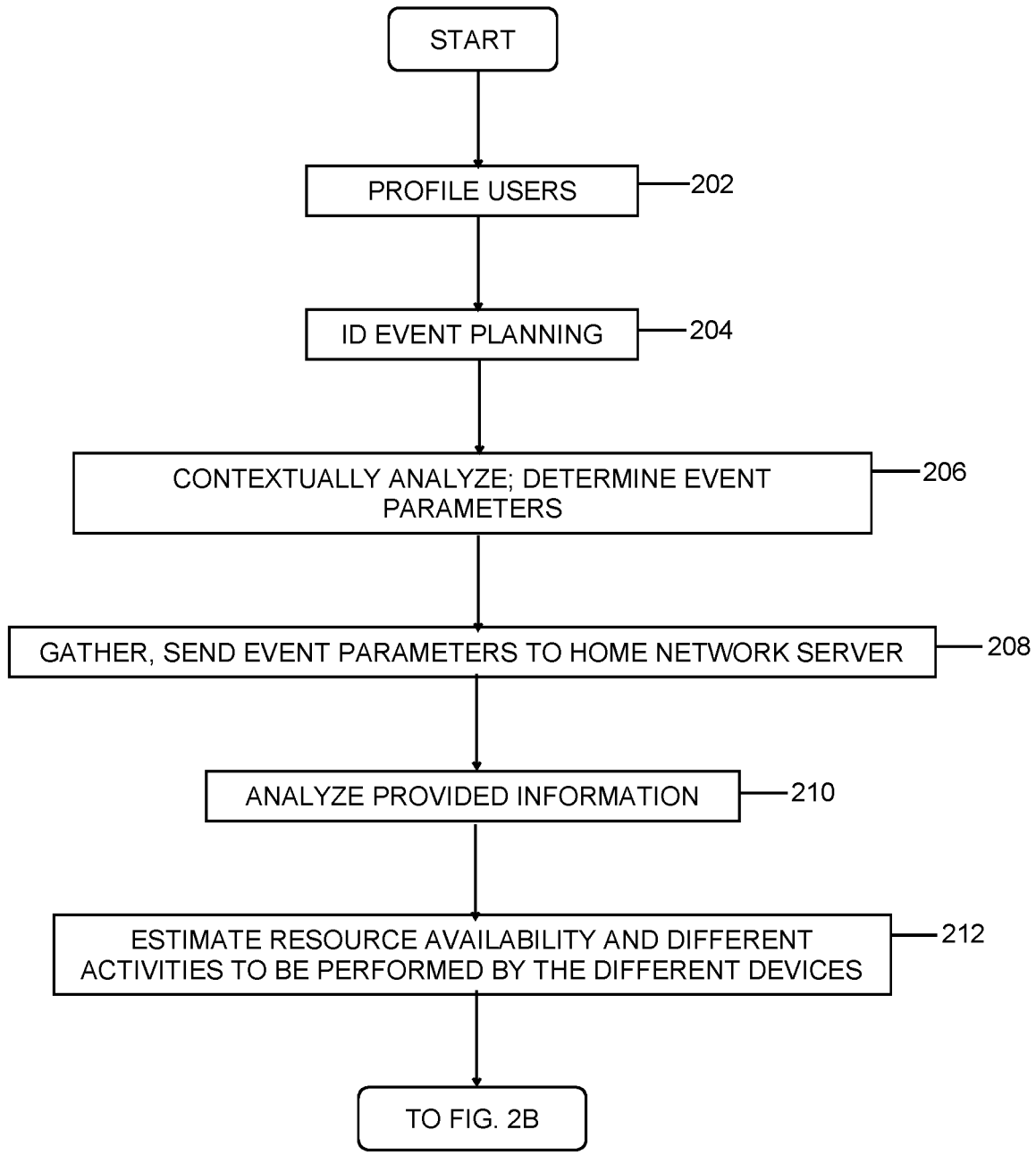
FIGS. 2A-2B collectively depict an example process for implementing event planning according to aspects described herein.
Figure 2B:
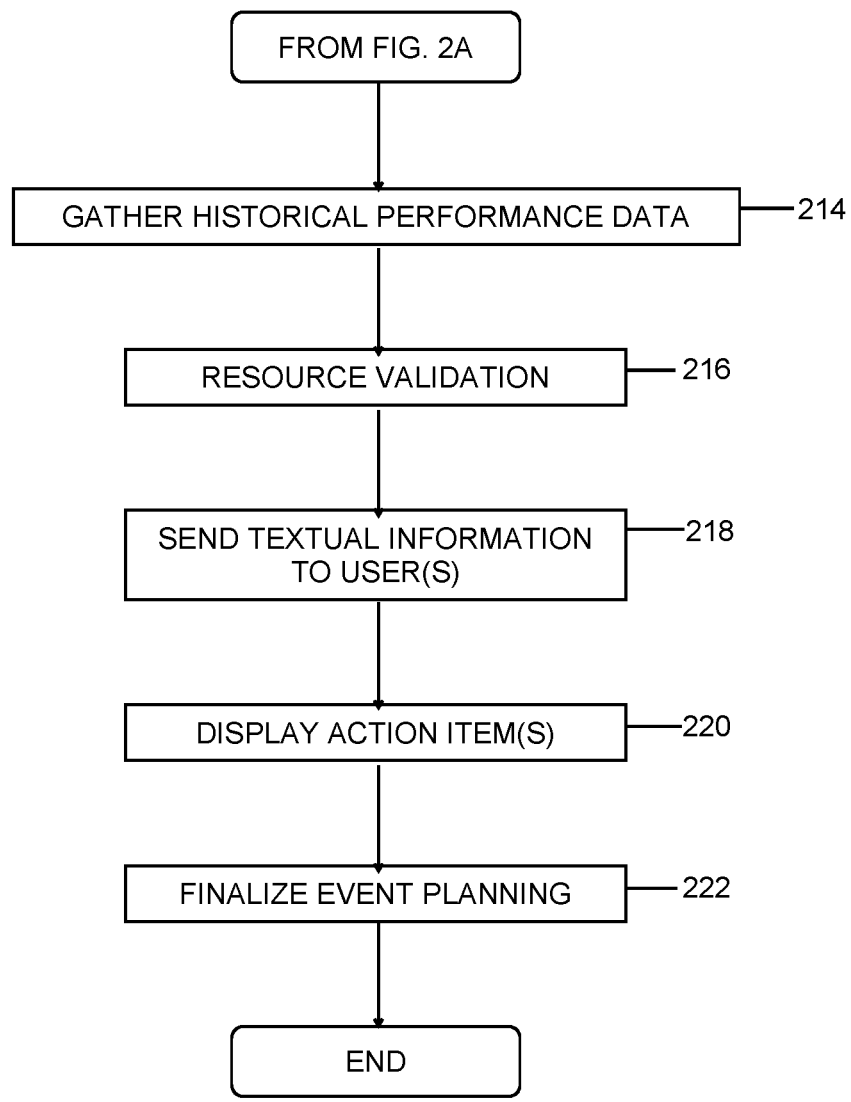

FIGS. 2A and 2B collectively depict an example process for implementing event planning according to aspects described herein. The process begins with the profiling of users in a social network (202), which may be performed by a social network server, for example. In this aspect, the social network server can track the users' presence on the social network, including interaction on different topics, expression of preferences such as likes and dislikes, content of posts, identification of friends and relationships, and so on. The profiling can be as detailed as desired. By way of specific example, the social network server might determine a user's preference for fish based on a post by the user including a photograph of a meal that he enjoyed and his statement that he likes this particular fish. Thus, a user's food & beverage preferences may be part of user's profile. The user's recent entertainment selections may also be identified based on analyzing the user's social interactions, posts, and likes. As an example, the user may have posted a 'wish list' of entertainment selections or activities (movies, games, sports teams, etc.).

The process continues with the social network server identifying the planning of an event (204). This can be based on interaction and/or activity by/between users and the contextual analysis of communications involving different topics. The communications between users may express an intention for the users to physically gather and interact. The social network can identify or predict if the involved users are planning an event, and if so a potential venue for that event, such as at a participating user's home. The identification of the planning of the event may therefore be based on recognizing the substance of the communications between users. In other examples, the identification is made based not on communications between users but by a single user's activity in the social network. For instance, the user may be setting up an event in the social network by selecting a date, time, invitees, etc., without communicating to others. Software can therefore perform contextual analysis, e.g. of the communications or other social network activity, and identify event parameters (206), for instance, whether the event is one for which resource validation may be desired; whether the event is being organized for a participating user's house, office, or other space; the required, anticipated, predicted or expected attendees; type of event (related to a birthday party, dinner party, lunch-party, other social gathering; and estimated resource consumption, for instance based on attendee profiles, etc.

The process continues with the social network server gathering event parameters and sending them to a participating user's home network server (208) as a solicitation for resource validation. The home network server then analyzes the provided information (210) to check the availability and capacity the home networking devices in terms of providing the resource. In this regard, the individual devices may be connected to the home network server and share their current condition or status, scheduled activity with service centers or other maintenance, quantity of a resource (level of juice in a bottle; percentage of remaining useful life of a water filter), available items, and so on. Based on this information, the home network server can estimate resource availability and different activities to be performed by the different devices (212). For example, a dishwasher may be called on to clean an estimated number of utensils (the dishwasher's cleaning activity is the resource that is consumed), and it can be determined whether the dishwasher is capable of supporting that resource consumption. It can also be determined whether the dishwasher is subject to any scheduled activity (downtime, maintenance, etc.). In some embodiments, the home network server also gathers historical performance of the devices (214, FIG. 2B), which may be used for analyzing the level of a resource that the device can deliver.

At this point, determinations may be made about the ability of the devices to support estimated resource consumption given the event parameters. In this example, the home network server performs different resource capacity and availability validation (216) by comparing social network information (e.g. details, such as event parameters, of an event) and the gathered information from the home network devices to make the assessment. In other examples, resource validation information is passed back to the social network, which performs this assessment.

In any case, the process of FIG. 2B continues with the home network server and/or social network sending textual or other information to a planning user (218), for instance in a same chat or other interface window as the user's communication with other potential event attendees. The textual information may be provided on a real-time basis offering up-to-date details about a device and its ability to support a level of resource consumption. The process can also display action items (220) for one or more devices. An action item can be configured to invoke an action that readies a device to support a desired resource consumption. For instance, if a resource to be consumed at the event is a movie to be shown on a television with a connected media streaming device, a planning user may be prompted (such as by the streaming device via the social network of home network server) to place an order for a digital copy of the movie. The action item may be a selection (YES) to order the movie, such that if the user selects to order the movie, that selection is configured to ready the streaming device (by downloading the movie) to support the viewing of that movie. Accordingly the user can make a decision about the action item. Thus, a contextual action item presented to a user can relate to an entertainment item or activity to provide during the event, the entertainment item or activity supported by the device. The action that readies the device can include an action to accommodate the entertainment item or activity. Other action items are possible, such as replenishing a consumable food or beverage.

The process of FIG. 2B then continues with the users finalizing the event planning (222). This may involve the users making a decision about when to hold the event based on the outcome of the resource validation. The analysis may indicate a particular time or times that all devices are able to support the estimated resource consumption. In some examples, those options are presented to a planning user and the user selects a finalized time for the event.

In some examples, the resource validation is performed for several different candidate venues for the event, and a selection is made as between the venues based on each venue's ability (i.e. ability of the connected devices thereof) to support estimated resource consumption.

Described herein are facilities for resource validation and event planning based thereon. This involves, in embodiments, contextual analysis of social interactions, which may be used to identify participants, preferences, and other parameters about an event. Based on patterns of social interaction, a contextual analysis engine can identify how many and who will be attending an event. Attendee preferences related to food and beverages, entertainment, activities, games, and so on factor into a determination about the resources to be available. Home network devices can perform capacity analysis to assist in a validation about whether or not the estimated resource consumption for the event can be supported. Real-time communication between a user and device(s) also supports a mutual decision about how to support a desired resource and whether a change in the event plan is to be made. This may include, based on an analysis of a resource capacity, a home network server providing to a user alternate options for the event and/or securing a desired resource in terms of availability and capacity for the event.

Additionally, a broad range of devices corresponding to many different resource types are supported. This includes not only devices for efficient power consumption (controlled light dimmer switches, smart outlets, smart power extension cords, etc.) but many other types of devices including household appliances, entertainment devices, HVAC and plumbing devices, and many others, which may all be important for a complete assessment of the viability of a venue to host an event.

Figure 3:
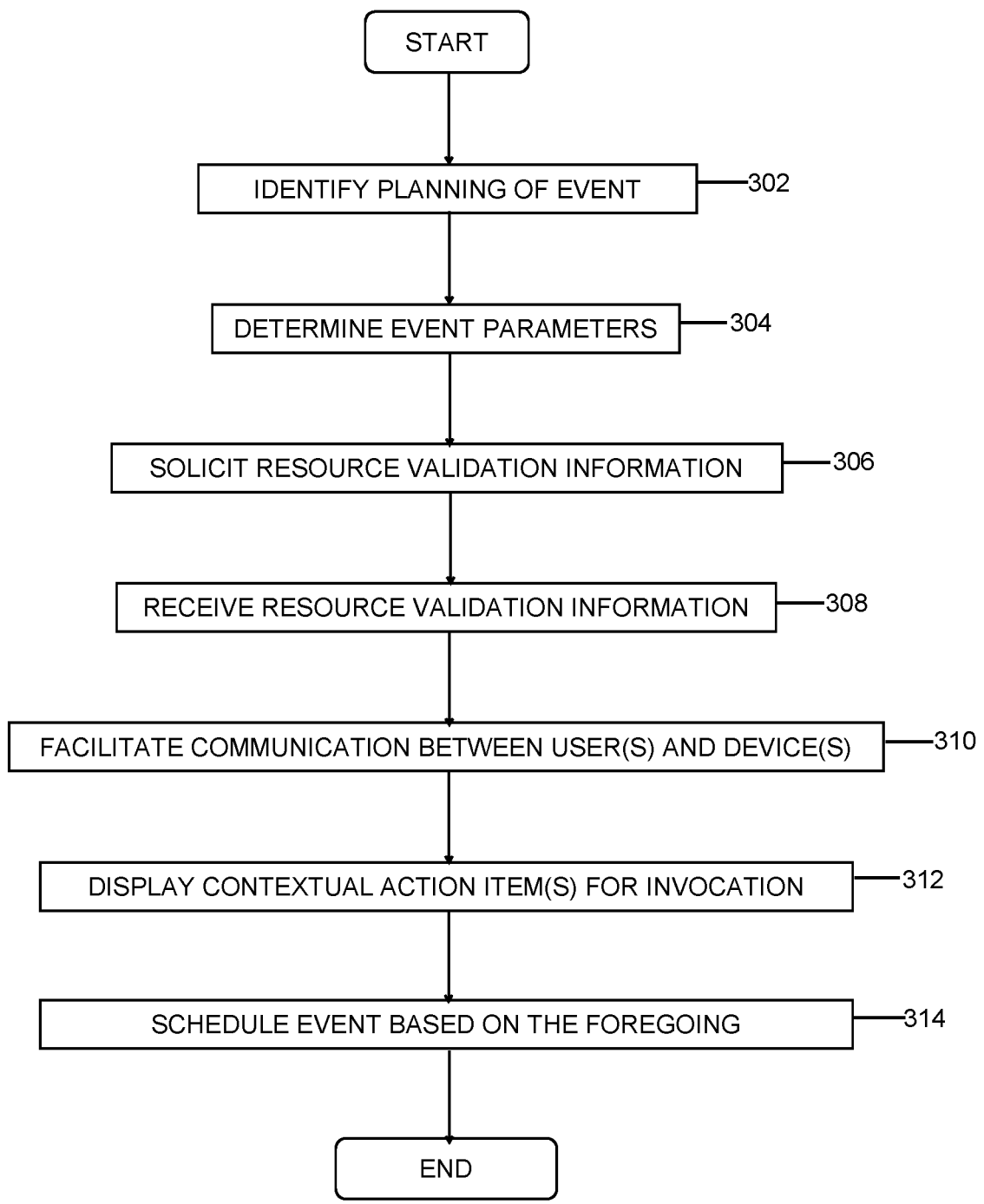
FIG. 3 depicts an example process for resource-validation based event scheduling, in accordance with aspects described herein.

FIG. 3 depicts an example process for resource-validation based event scheduling, in accordance with aspects described herein. In some examples, the process is performed one or more computer systems, such as those described herein, which may include one or more cloud servers, such as server(s) supporting one or more wearable sensor devices, and/or one of more other devices, such as home network server(s) or other home network device(s).

The process of FIG. 3 includes identifying planning of an event (302). This identifying may be based on activity in a social network. In some examples, this activity in the social network includes communications between users of the social network to physically meet, and the identifying of the planning of the event is based on recognizing those communications.

The process of FIG. 3 proceeds by determining event parameters of the event (304), an example process of which is depicted and described below with reference to FIG. 4. Continuing with FIG. 3, the process proceeds by soliciting resource validation information (306), for instance from one or more devices corresponding to one or more resources at a location for the event. The resource validation information can indicate the ability of the one or more devices to support estimated resource consumption for each of the one or more resources. The estimated resource consumption can be based on the determined event parameters. Thus, the event parameters may inform about the particular resources that will or may be desired at the event, as well as the levels of consumption of those resources. The resource validation information can be information that indicates the ability of the devices to support the estimate resource consumption. For example, the validation information may include express indications about capacity, availability, etc. for a given estimated consumption, and/or may provide information about the device or resource that is then used to assess the ability of the device to support the estimated resource consumption. For instance, a dishwasher may indicate that it will not be able to wash 30 dishes needed for 30 attendees to a party, or the dishwasher may provide general information about the number of dishes it can wash simultaneously (e.g. 20) to another device, such as the home network server or a social network server, which then compares that information against an estimated resource consumption (30 dishes) in assessing the dishwasher's ability to support that resource consumption.

The resource validation information can indicate an ability, for each device of the one or more devices, to support estimated resource consumption for a resource (or more than one resource), of the one or more resources, to which the device corresponds.

The estimated resource consumption for a given resource can encompass one or more resource consumption times (e.g. timing of when the resource will be consumed) and quantity of the resource estimated to be consumed, and those values can be based on at least one event parameter of the one or more event parameters. The ability of a device to support the estimated resource consumption can include the ability to provide the resource at the resource consumption time(s) and the ability to provide the quantity estimated to be consumed.

In some examples, the resource validation information includes a maintenance status of the device. Maintenance status can indicate necessary service or maintenance, levels of consumable items needed to deliver a resource (e.g. percentage usage of an air or water filter, battery level in a batter-operated device that delivers a resource, etc.). Maintenance status may also encompass the scheduling of service or maintenance.

The resource validation information can sometimes include a recommendation by a device for one or more times at which to schedule the event, e.g. time(s) at which the device has the ability to support the estimated resource consumption for the resource. An event may be planned for Sunday afternoon when maintenance on an appliance is scheduled, so the appliance may recommend that the event instead be held later that evening after maintenance completes.

The process of FIG. 3 proceeds by receiving the resource validation information (308). In some examples this information is received by a social network server from a home network device and/or received directly from individual devices in the home or other event venue.

In some examples, in furthering the planning of an event, the method includes facilitating communication between a user of the social network who is planning the event and a device of the one of the one more devices corresponding to a resource of the one or more resources (310). The communication can include, additional details about an ability of the device to support the estimated resource consumption for the resource, and/or details about options that the device supports for delivering the resource, as examples. Examples of this communication include offers to purchase or procure needed materials, and provision of more detailed information (such as details about scheduled maintenance) to the user.

In this regard, the process of FIG. 3 also includes displaying a contextual action item (312) to user(s) of the social network who is/are planning the event, for instance. The action item may be configured to invoke an action that readies a device of the one or more devices to support the estimated resource consumption for a resource, of the one or more resources, to which the device corresponds. In particular examples, the contextual action item relates to an entertainment item or activity to provide during the event. The entertainment item or activity may be digital content, a game, or any other activity supported by the device. The action that readies the device will vary accordingly, but generally can include an action to accommodate the entertainment item or activity, such as ordering a movie or program that attendees desire to watch during the event.

Ultimately the process proceeds to scheduling the event based on the resource validation information (314), that is based on the ability of the device(s) to support the estimated resource consumption. As an example, this includes presenting a selection of one or more times to hold the event to a user of the social network who is planning the event. The presented times may be recommended or ascertained based on the validation information for one or more devices. Scheduling the event may include receiving from the user a selection of a time from those presented one or more times, and then scheduling the event at the selected time.

Figure 4:
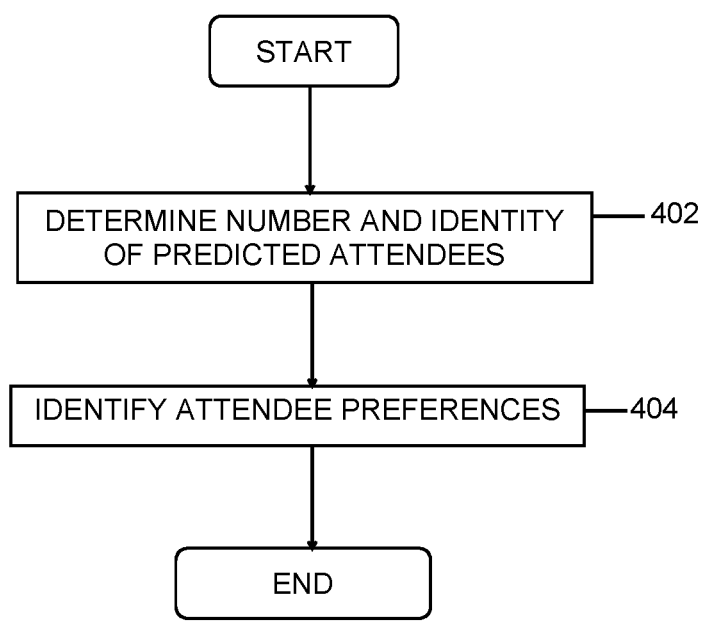
FIG. 4 depicts an example process for determining event parameters, in accordance with aspects described herein.

FIG. 4 depicts an example process for determining event parameters of an event, in accordance with aspects described herein. In some examples, the process of FIG. 4 is performed by a social network server or another computer system. The process determines a number and identity of the predicted attendees (402). This is done in some examples by analyzing the communications from which the planning of the event was identified, to identify the parties to the communications, and users mentioned in those communications as being potential attendees. It may also include looking at a group membership to determine members of a group that is identified as being a target invitee for the event.

The process of FIG. 4 also profiles the predicted attendees of the event to identify attendee preferences (404). In some examples, this profiling happens over a period of time spanning a timeframe prior to the event planning. In any case, the profiling can profile a predicted attendee by analyzing any of various items associated with the user, for instance at least one selected from the group consisting of: posts, likes, dislikes, recent comments, and status updates posted by the predicted attendee to the social network. The attendee preferences can include any preferences regarding resources that the attendee may consume, such preferences selected from the group consisting of: food or beverage preference, entertainment preference, and activity preference. Event parameters including the determined anticipated number of attendees and the attendee preferences may in some cases be packaged and provided to a network server or devices at a prospective location at which the event may be held.

Although various examples are provided, variations are possible without departing from a spirit of the claimed aspects.

Figure 5:
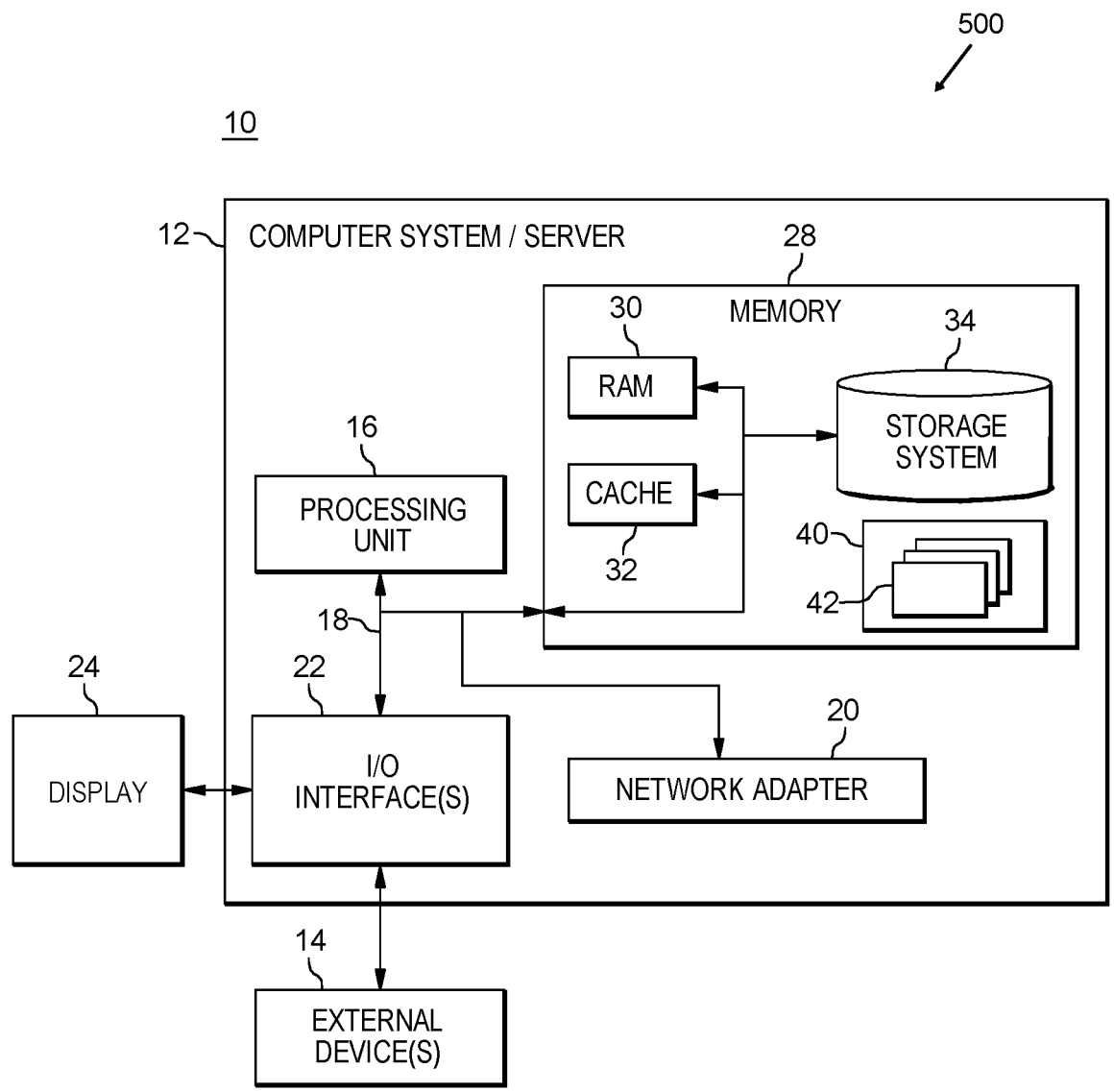
FIG. 5 depicts one example of a computer system and associated devices to incorporate and/or use aspects described herein.

Processes described herein may be performed singly or collectively by one or more computer systems, such as one or more cloud servers or backend computers (e.g. one or more social network servers), home network servers, smart device or other network-connected devices, or a combination of the foregoing. FIG. 5 depicts one example of such a computer system and associated devices to incorporate and/or use aspects described herein. A computer system may also be referred to herein as a data processing device/system or computing device/system/node, or simply a computer. The computer system may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

As shown in FIG. 5, a computing environment 500 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, workstations, laptops, handheld devices, mobile devices/computers such as smartphones, tablets, and wearable devices, multiprocessor systems, microprocessor-based systems, telephony device, network appliance (such as an edge appliance), virtualization device, storage controller set top boxes, programmable consumer electronics, smart devices, intelligent home devices, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media such as erasable programmable read-only memory (EPROM or Flash memory). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more computer application programs, other program modules, and program data. Computer programs may execute to perform aspects described herein. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Input/Output (I/O) devices (including but not limited to microphones, speakers, accelerometers, gyroscopes, magnetometers, sensor devices configured to sense light, ambient temperature, levels of material), activity monitors, GPS devices, cameras, etc.) may be coupled to the system either directly or through I/O interfaces 22. Still yet, computer system/server 12 may be able to communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter(s) may also enable the computer system to become coupled to other computer systems, storage devices, or the like through intervening private or public networks. Ethernet-based (such as Wi-Fi) interfaces and Bluetooth® adapters are just examples of the currently available types of network adapters used in computer systems.

It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
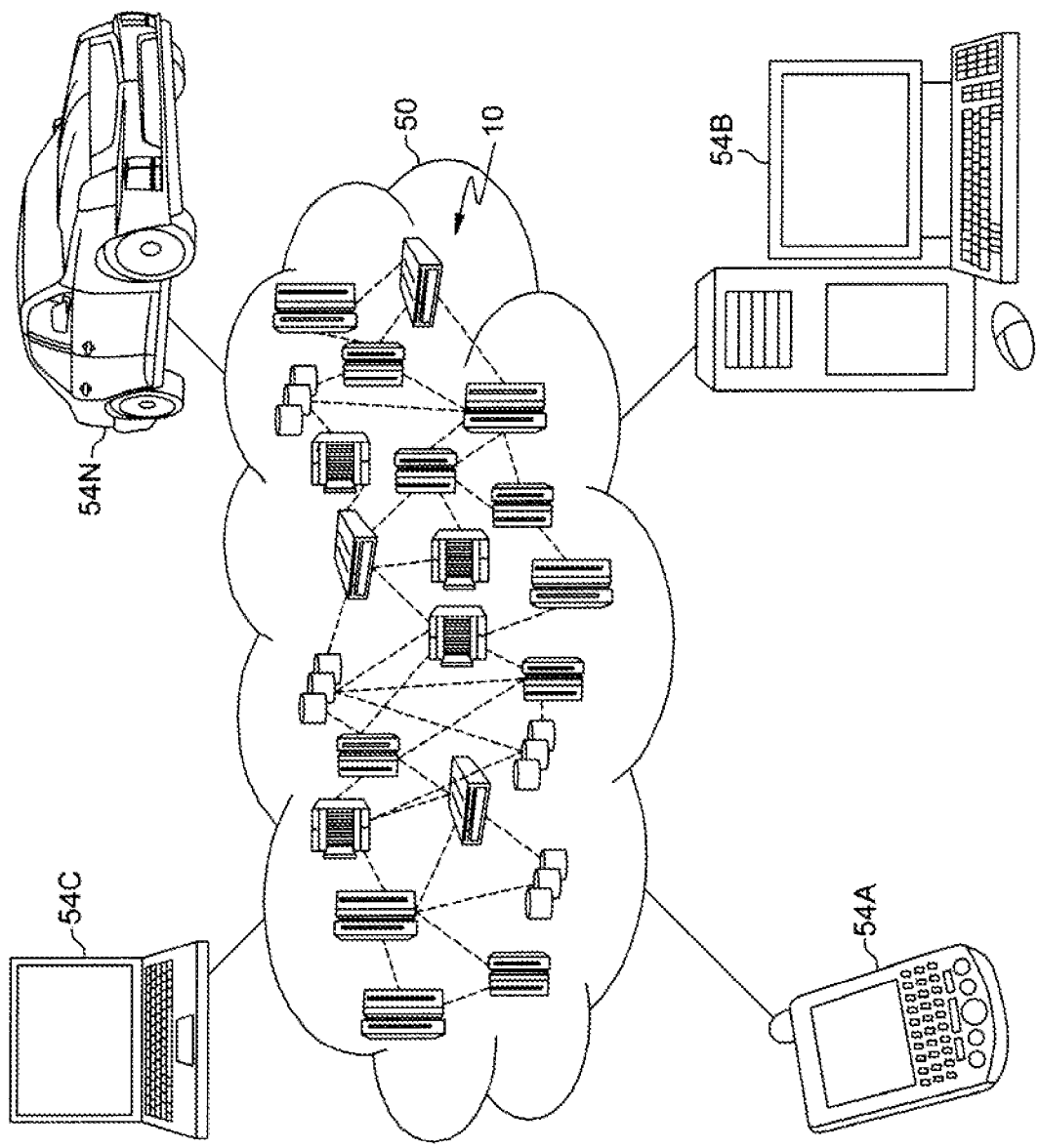
FIG. 6 depicts one embodiment of a cloud computing environment.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
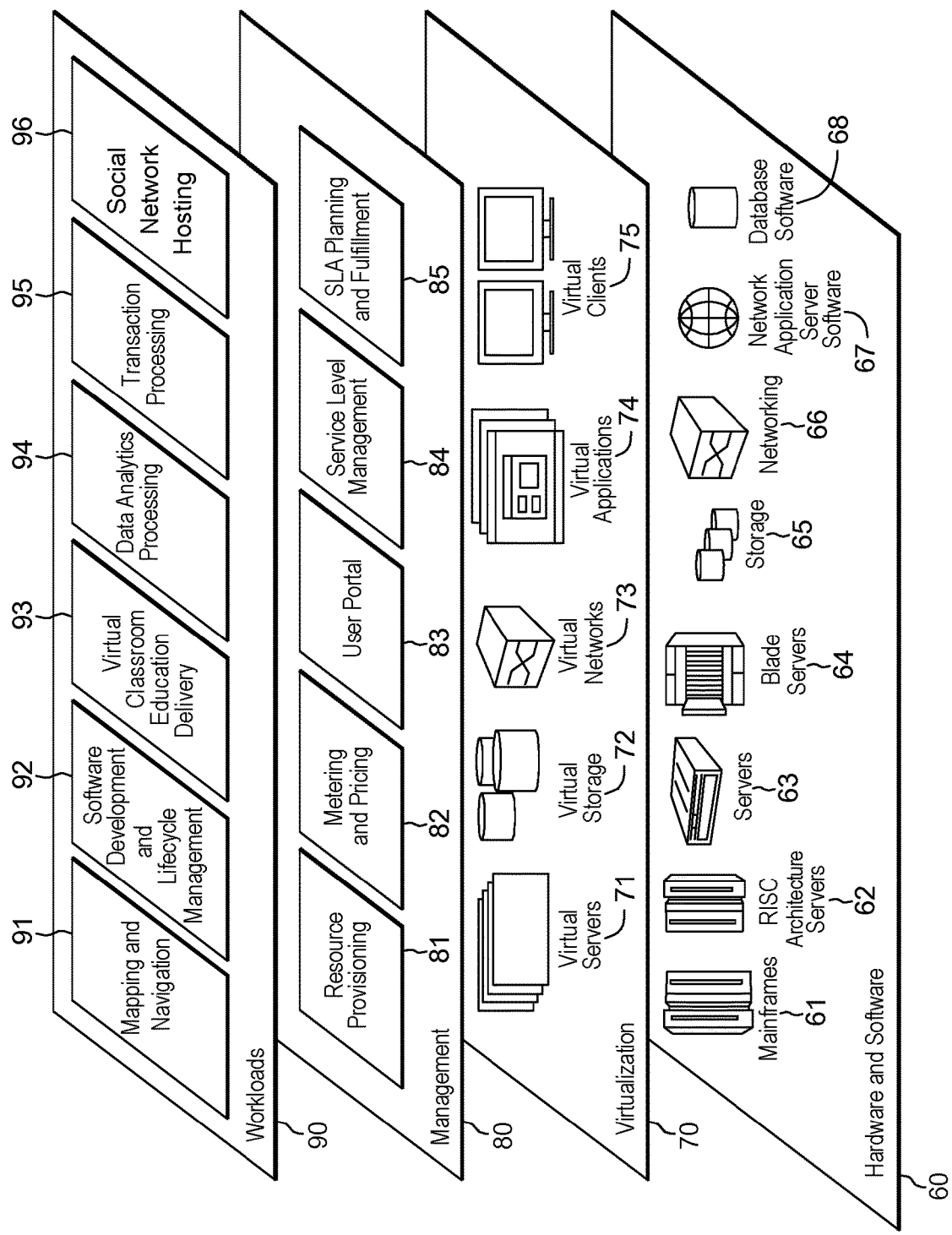
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social network hosting 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
identifying, based on activity in a social network, planning of an event;
determining event parameters of the event, the determining the event parameters comprising:
determining an anticipated number of attendees of the event; and
profiling predicted attendees of the event to identify attendee preferences, wherein the event parameters comprise the determined anticipated number of attendees and attendee preferences;
soliciting resource validation information from one or more network connected smart devices providing one or more resources at a location for the event, the resource validation information indicating ability of each network connected smart device of the one or more network connected smart devices to support estimated use of the network connected smart device, the estimated use being based on the determined event parameters;
receiving from the one or more network connected smart devices the resource validation information; and
scheduling the event based on the resource validation information.

2. The method of claim 1, wherein the profiling profiles a predicted attendee of the predicted attendees by analyzing at least one selected from the group consisting of: posts, likes, dislikes, recent comments, and status updates posted by the predicted attendee to the social network.

3. The method of claim 1, wherein the attendee preferences comprise an attendee preference selected from the group consisting of: food or beverage preference, entertainment preference, and activity preference.

4. The method of claim 1, wherein the resource validation information indicates an ability of a network connected smart device of the one or more network connected smart devices to support estimated use of the network connected smart device in providing a resource of the one or more resources.

5. The method of claim 4, wherein the estimated use encompasses one or more resource consumption times and quantity of the resource estimated to be consumed based on at least one event parameter of the one or more event parameters, wherein the ability of the network connected smart device to support the estimated use includes the ability to provide the resource at the one or more resource consumption times and the ability to provide the quantity estimated to be consumed.

6. The method of claim 4, wherein the resource validation information includes a maintenance status of the network connected smart device.

7. The method of claim 4, wherein the resource validation information includes a recommendation by the network connected smart device for one or more times at which to schedule the event and at which the network connected smart device has the ability to support the estimated use.

8. The method of claim 7, further comprising:
providing a selection of the one or more times to a user of the social network who is planning the event; and
receiving from the user a selection of a time from the one or more times, wherein the scheduling the event schedules the event at the selected time of the one or more times.

9. The method of claim 1, wherein the activity in the social network comprises communications between users of the social network to physically meet, and the identifying the planning of the event is based on recognizing the communications.

10. The method of claim 1, further comprising facilitating communication between a user of the social network who is planning the event and a network connected smart device, of the one of the one more network connected smart devices, providing a resource of the one or more resources, the communication including (i) additional details about an ability of the network connected smart device to support the estimated use, and (ii) details about options that the network connected smart device supports for providing the resource.

11. The method of claim 1, further comprising displaying a contextual action item to a user of the social network who is planning the event, the action item configured to invoke an action that readies a network connected smart device of the one or more network connected smart devices to support the estimated use of the network connected smart device in providing a resource of the one or more resources.

12. The method of claim 11, wherein the contextual action item relates to an entertainment item or activity to provide during the event, the entertainment item or activity supported by the network connected smart device, and wherein the action that readies the network connected smart device comprises an action to accommodate the entertainment item or activity.

13. A computer system comprising:
a memory; and
a processor in communication with the memory, wherein the computer system is configured to perform a method comprising:
identifying, based on activity in a social network, planning of an event;
determining event parameters of the event, the determining the event parameters comprising:
determining an anticipated number of attendees of the event; and
profiling predicted attendees of the event to identify attendee preferences, wherein the event parameters comprise the determined anticipated number of attendees and attendee preferences;
soliciting resource validation information from one or more network connected smart devices providing one or more resources at a location for the event, the resource validation information indicating ability of each network connected smart device of the one or more network connected smart devices to support estimated use of the network connected smart device, the estimated use being based on the determined event parameters;
receiving from the one or more network connected smart devices the resource validation information; and
scheduling the event based on the resource validation information.

14. The computer system of claim 13, wherein the profiling profiles a predicted attendee of the predicted attendees by analyzing at least one selected from the group consisting of: posts, likes, dislikes, recent comments, and status updates posted by the predicted attendee to the social network.

15. The computer system of claim 13, wherein the resource validation information indicates an ability of a network connected smart device of the one or more network connected smart devices to support estimated use of the network connected smart device in providing a resource of the one or more resources.

16. The computer system of claim 15, wherein the estimated use encompasses one or more resource consumption times and quantity of the resource estimated to be consumed based on at least one event parameter of the one or more event parameters, wherein the ability of the network connected smart device to support the estimated use includes the ability to provide the resource at the one or more resource consumption times and the ability to provide the quantity estimated to be consumed.

17. The computer system of claim 15, wherein the resource validation information includes a recommendation by the network connected smart device for one or more times at which to schedule the event and at which the network connected smart device has the ability to support the estimated use.

18. The computer system of claim 13, wherein the method further comprises facilitating communication between a user of the social network who is planning the event and a network connected smart device, of the one of the one more network connected smart devices, providing a resource of the one or more resources, the communication including (i) additional details about an ability of the network connected smart device to support the estimated use, and (ii) details about options that the network connected smart device supports for providing the resource.

19. The computer system of claim 13, wherein the method further comprises displaying a contextual action item to a user of the social network who is planning the event, the action item configured to invoke an action that readies a network connected smart device of the one or more network connected smart devices to support the estimated use of the network connected smart device in providing a resource of the one or more resources.

20. A computer program product comprising:
a computer readable storage medium readable by a processing circuit and storing instructions for execution by the processing circuit for performing a method comprising:
identifying, based on activity in a social network, planning of an event;
determining event parameters of the event, the determining the event parameters comprising:
determining an anticipated number of attendees of the event; and
profiling predicted attendees of the event to identify attendee preferences, wherein the event parameters comprise the determined anticipated number of attendees and attendee preferences;
soliciting resource validation information from one or more network connected smart devices providing one or more resources at a location for the event, the resource validation information indicating ability of each network connected smart device of the one or more network connected smart devices to support estimated use of the network connected smart device, the estimated use being based on the determined event parameters;

receiving from the one or more network connected smart devices the resource validation information; and scheduling the event based on the resource validation information.

\* \* \* \* \*